June 17, 1969 G. D. MILES 3,450,254
PACKAGE AND RECEPTACLE
Filed April 5, 1967
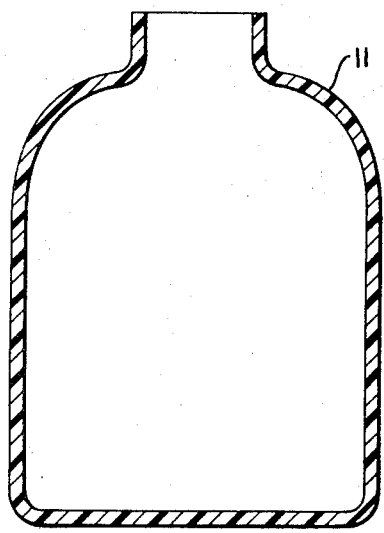
Fig. 1
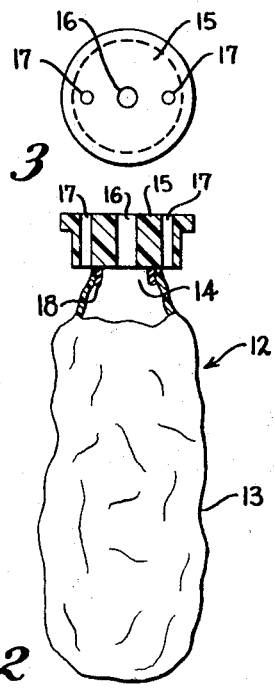
Fig. 3
Fig. 2
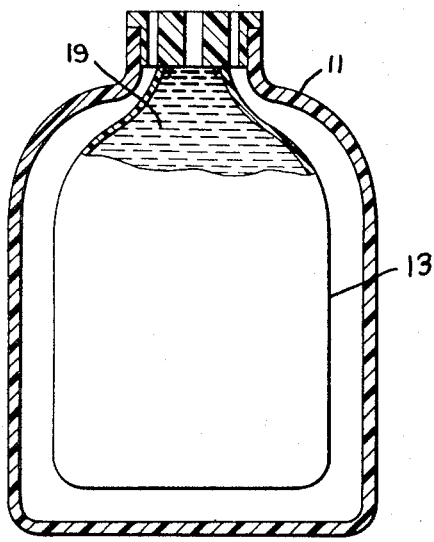
Fig. 4
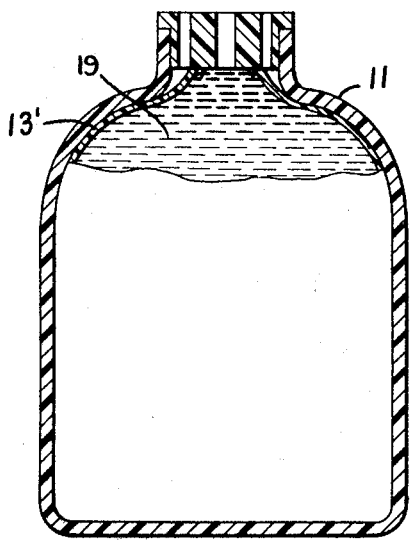
Fig. 5
INVENTOR
Gilbert Dewayne Miles
BY Thomas J. Corum
ATTORNEY

United States Patent Office 3,450,254
Patented June 17, 1969

3,450,254
PACKAGE AND RECEPTACLE
Gilbert Dewayne Miles, Ossining, N.Y., assignor to Colgate-Palmolive Company, New York, N.Y., a corporation of Delaware
Filed Apr. 5, 1967, Ser. No. 628,737
Int. Cl. B65d 85/00, 1/04, 23/00
U.S. Cl. 206—46                    6 Claims

ABSTRACT OF THE DISCLOSURE

The receptacle disclosed herein includes an inner portion of relatively highly plasticized synthetic resin, such as polyvinyl chloride, so that said inner portion is initially flexible. The inner portion is fitted internally of said receptacle which may be in spaced relationship to said receptacle. Then either the inner portion or the space defined between the inner portion and said receptacle is filled with a liquid having the ability to leach out the plasticizer of the inner portion whereby the inner portion loses substantially its plasticized state and concomitantly its flexibility.

---

This invention relates to a compartmented receptacle and method for making same. More particularly, this invention relates to a receptacle of the bottle type having a flexible plastic insert which is hardened in situ.

It is frequently desirable to produce compartmented containers wherein the container is constructed of glass or plastic material. Various techniques are employed in fabricating such containers as by casting or blow molding. Often times, containers have relatively small mouths making it difficult to include inserts in order to form the compartments wherein the transverse cross-section is larger than the container.

In the present invention, an insert receptacle is used which is initially extremely flexible so that it may be collapsed radially, for instance, and passed through the mouth of the container. The flexible insert receptacle also has a mouth which is aligned with respect to the mouth of what constitutes the outer container, preferably, concentrically. By adhesive means, for instance, the insert is secured to the mouth portion of the outer container yet, of course, permitting access internally to the flexible insert and to the space defined by the container and insert. The flexible insert is then expanded to its full size and treated in situ to harden it. The hardening step depends upon the nature of the insert and the selective solvent liquid that is poured either into the insert or into the space defined by the container and insert, or both. The expansion of the insert may be accomplished by filling the insert with the treating liquid.

In order for the liquid to be effective, it is necessary that the insert be fabricated of a plastic material which, when relatively pure is quite inflexible as compared with the same plastic material which contains a plasticizer. The treating liquid should have the ability to leach the plasticizer from the insert thereby removing its function, that is, hardening the insert.

Many plasticized plastics are suitable for this invention to a greater or lesser extent. Some materials, however, have been found to give a degree of distortion, to develop cracks when a large amount of plasticizer is extracted or to be considerably reduced in size. Highly plasticized polyvinyl chloride and polyvinyl chloride acetate have been found to be particularly suitable as giving a high degree of hardening without appreciable distortion or cracking. Good results have also been achieved with ethyl cellulose. Other plasticized plastics may be used such as nylon, polyvinyl butyral, cast methyl, methacrylate including a plasticizer and plasticized cellulose nitrate. Substantially unplasticized plastics such as polystyrene and normal formulations of thermosetting resins cannot, of course, be expected to be as suitable.

The plasticizer will vary according to the composition of the resin. In most cases, a wide range of plasticizers is available and in selecting a suitable plasticizer the availability should be considered of selective solvents as the liquid which will remove the plasticizer without substantially attacking the resin. In the case of polyvinyl chloride resin, dioctyl phthalate exemplifies a suitable plasticizer. Other compatible plasticizers may be used including various waxes, aryl phosphates, various dialkyl phthalates, triphenyl phosphate and many others which are disclosed in the technical literature.

A stabilizer for the plastic may, if desired be included in the formulation, such as lead silicate for a polyvinyl chloride resin. Since, however the insert is being formed for temporary purposes as is, the stabilizer may, if desired, be omitted. Where the binder is polyvinyl chloride resin and the plasticizer is dioctyl phthalate, suitable selective solvents as the liquid for the plasticizer are exemplified by ethyl alcohol, ethyl acetate and mixtures thereof. Ethyl alcohol in the form of a commercial 95% solution will be satisfactory but appreciable quantities of additional water should not be added in order to preserve its effectiveness as a solvent. Other selective solvents such as diethyl ether may be used.

In accordance with the concepts of the invention, it has been found propitious to use polyvinyl chloride as the plastic material from which the insert may be fabricated. The plasticizer incorporated in the polyvinylchloride will have to be compatible therewith and should be sufficient to accomplish the necessary plasticity to permit the insert to be collapsed; yet should not be in such quantities as to form a plastisol that is, nonself-supporting.

Water may be used as the treating liquid when the plasticizer employed is water soluble. Plasticizers soluble in water include polyethylene glycols of low molecular weight, diethylene glycol, triethylene glycol, glycerol, glycerol monoacetate, butylene glycol, hexylene glycol, hydroxyethylated formamide and acetamide. Particularly, suitable plasticizers include polyethylene glycols having an average molecular weight of from about 300 to 600 and 1,2,6-hexanetriol.

Other plasticizers applicable to the present invention which are soluble in an organic solvent are: tricresyl phosphate, dibutoxethyl phthalate, butoxy glycol phthalate and dibutyl sebacate.

One example of a preferred embodiment, the material of the insert comprises one-hundred parts by weight of polyvinyl chloride resin, one-hundred parts of dioctyl phthalate plasticizer and three parts of lead silicate stabilizer. The thickness of the walls of the insert is 0.060 inch or about 1.5 millimeters.

The composition of the illustrative finished insert consists substantially of 49% polyvinyl chloride, 49% of plasticizer and 2% stabilizer. These proportions are by weight.

The invention is further illustrated in the drawings.

FIGURE 1 is a longitudinal cross-section of the container;
FIGURE 2 is a longitudinal cross-section of the insert;
FIGURE 3 is a top view of the insert;
FIGURE 4 is a cross-sectional view with the insert in the container; and
FIGURE 5 is a cross-sectional view with the insert acting as a liner.

The invention is most readily applicable to inserts which are of thin wall thickness. If there is a thick wall thickness, more time will be required for the removal of the plasticizer, and in extreme cases, it may be difficult to remove the plasticizer from the central portion of the wall within a reasonable time and without some removal of or distortion of the binder at the surfaces. In this connection, a thin wall thickness is used to refer to wall thicknesses varying from a minimum thickness of self-supporting film to about a ¼ inch. A typical wall thickness is one-sixteenth of an inch.

If desired, finely divided fillers, such as silica and mica, can be included with the plastic composition. It is preferred that the fillers be omitted.

The polyvinyl resins are resistant to alcohols and insoluble in aliphatic hydrocarbons, amyl acetate, butyl acetate, ethyl acetate and other organic solvents. Hence, numerous solvents can be used to extract plasticizers from vinyl resin. Ethyl alcohol and other alcohols soften the polyvinyl resins, but do not substantially dissove said resins.

A selective solvent as an example is made by mixing commercial ethyl alcohol with commercial ethyl acetate. This commercial ethyl alcohol contains 95% of ethyl alcohol by weight. The commercial ethyl acetate contains 85% to 88% of ethyl acetate by weight. Three parts of said commercial ethyl alcohol are mixed with one part of said commercial ethyl acetate. This ratio is by weight. The ethyl alcohol also acts as a softening agent so that the solvent can more readily penetrate the wall of the insert. The solvent penetrates the thin wall of the insert during this immersion period and it dissolves and extracts at least some of the dioctyl phthalate plasticizer. The polyvinyl chloride and the lead silicate are substantially insoluble in the selective sovent. The extraction of the plasticizer is rapid at first, and such extraction then proceeds more slowly so that there is only slight extraction at the end of this immersion period of forty-eight hours.

If the resin is celluose acetate, the plasticizer is exemplified by dimethyl phthalate, dibutyl tartrate, triacetin and glyceryl triacetate. Cellulose acetate is softened by alcohols, but is substantially insoluble therein. Ethyl alcohol can therefore be used to remove plasticizers which are soluble in ethyl alcohol. Ethyl acetate should not, however, be used, as cellulose acetate is soluble in ethyl acetate.

The plasticizers for ethyl cellulose may be selected from a wide range, including the plasticizers which have been mentioned for polyvinyl chloride and various waxes, oils, esters and ethers. However, some of these plasticizers such as plasticizing oils, for example castor oil, should be avoided due to the difficulty of extracting such plasticizers. Plasticizers such as those used with alkyl resins to give internal plasticization should also be avoided and more readily extractable chemical plasticizers should be used.

The plasticizers for cellulose plastics include ortho and para toluenesulfonamide. These are soluble in ethers. Some ethers such as diisopropyl ether have little effect on resins such as cellulose acetate butyrate and therefore may be used as selective solvents for these plasticizers.

The solvent liquid is poured into the insert while maintaining it at a temperature of 20°–25° C. for a period, for example of 48 hours.

Now, as a means for further elucidation, attention is directed to the drawings. FIGURE 1 is a container 11 in cross-section which may be fabricated of glass or plastic by suitable conventional procedures such as casting and blow molding. In FIGURE 2, the insert 12 is shown generally with a flexible collapsed lower portion 13 having a tubular configuration. The lower portion 13 has its mouth 14 secured to a stopper 15 which has a centrally disposed hole 16 and additional orifices 17. The lower portion is adhesively secured to a depending flange 18 of the stopper 15. Hole 16 permits communication internally with the lower portion. Additional orifices 17 permit communication with the space defined by the container 11 and the lower portion 13. FIGURE 3 shows the stopper 15 with the various orifices.

The insert 12 is positioned in container 11. Then the selective liquid 19 is poured into the insert 12 through orifice 16 resulting in the view of FIGURE 4. It will be seen that the liquid also expands the collapsed lower portion and begins the extractive process. Additional selective liquid may be introduced to the other side of the lower portion 13 to quicken the leaching process. On the other hand, the liquid in the insert may be a nonsolvent for the plasticizer but may expand the insert by virtue of its hydrostatic pressure and the entire extractive step may be carried out by the presence of selective liquid in the space defined by the container 11 and the insert.

When liquid is poured into the insert, the orifices 17 act as vents as the insert expands. After the hardening step the selective liquid may be poured out. The orifices 17 may be sealed and the space between the container and insert may be unfilled so as to act as an insulative barrier for the contents, whatever it may be in the insert. On the other hand, different incompatible liquids may be measured into the hardened insert and the space between the container and insert and in that way keep the liquids separated until used.

Particular usefulness is garnered when two disparate liquids are packaged and one or both of the liquids has the ability to extract the plasticizer without destroying its own usefulness for its intended purpose. In those instances, the liquids may be packaged and sealed, without the hardening step as the hardening having to be accomplished as a separate step as it will occur after the container has been filled and sealed.

FIGURE 5 depicts another embodiment of the present invention. Instead of providing a space between the container and the insert, the insert is constructed to have a configuration and size substantially identical to the inside of container 11 so as to act as a liner 13' when it is fully expanded and hardened. Orifices 17 merely act as vents for the escape of displaced air when the insert is expanded.

While in the above, a stopper arrangement has been shown for holding and positioning the insert, it will be obvious that a number of other means will come to mind.

It will be apparent that many changes and modifications of the several features described herein may be made without departing from the spirit and scope of the invention. It is therefore apparent that the foregoing description is by way of illustration of the invention rather than limitation of the invention.

What is claimed is:

1. A multiwalled container containing a liquid comprising an outer receptacle, said outer receptacle having an opening therethrough for communication with the inside of said outer receptacle, an inner receptacle having an opening therethrough for communication with the inside of said inner receptacle, the inner receptacle being mounted within the outer receptacle whereby the opening of said inner receptacle communicates through an opening of said outer receptacle to outside the multiwalled container, said inner receptacle being of a plastic material containing a plasticizer resulting in flexibility and which is soluble in said liquid whereby the plasticizer is leached out of the inner receptacle thereby hardening said inner receptacle.

2. The multiwalled container of claim 1 wherein the outer receptacle and inner receptacle are in spaced relationship.

3. The multiwalled container of claim 2 wherein the outer receptacle has a neck portion terminating in said opening, the inner receptacle has a neck portion terminating in said opening, the necks of said receptacles are in a concentric position with respect to each other, an outer peripheral portion of the neck of said inner receptacle is secured to an inner peripheral portion of the neck of said outer receptacle.

4. The multiwalled container of claim 1 wherein the plastic is polyvinylchloride and the plasticizer is octyl phthalate.

5. In combination, a multiwalled container adapted to hold at least one liquid and having an outer receptacle with a neck portion and an opening therethrough for communication with the inside of said outer receptacle and a hardened inner receptacle mounted within the outer receptacle, said inner and outer receptacles being discrete, the inner receptacle comprising a flexible plastic material containing a leachable plasticizer and having a neck portion, an aperture in said neck portion for communication with the inside of said flexible plastic material, means to communicate the area between said inner and outer receptacles with the outside, said flexible plastic material having been treated with a leaching liquid which leaches out the plasticizer from the flexible plastic material to thereby harden said material whereby said hard inner receptacle is formed.

6. The multiwalled container of claim 5 wherein the plastic is polyvinylchloride and the plasticizer is octyl phthalate.

References Cited

UNITED STATES PATENTS

| | | | |
|---|---|---|---|
| 2,699,434 | 1/1955 | Turck | 260—31.8 |
| 2,760,972 | 8/1956 | Joy | 260—31.8 XR |
| 2,805,787 | 9/1957 | Sherman | 215—13 XR |
| 2,961,849 | 11/1960 | Hitchcock. | |
| 2,987,212 | 6/1961 | Scanlon | 220—63 XR |
| 3,037,652 | 6/1962 | Wallace | 215—13 |
| 3,311,248 | 3/1967 | Marchant | 215—13 |

DONALD F. NORTON, *Primary Examiner.*

U.S. Cl. X.R.

215—1, 6, 12; 220—63; 264—88